United States Patent
Kolosnitsyn et al.

(10) Patent No.: US 10,461,316 B2
(45) Date of Patent: Oct. 29, 2019

(54) REINFORCED METAL FOIL ELECTRODE

(71) Applicant: Oxis Energy Limited, Oxfordshire (GB)

(72) Inventors: Vladimir Kolosnitsyn, Ufa (RU); Elena Karaseva, Ufa (RU)

(73) Assignee: Oxis Energy Limited, Oxfordshire (GB)

( * ) Notice: Subject to any disclaimer, the term of this patent is extended or adjusted under 35 U.S.C. 154(b) by 329 days.

(21) Appl. No.: 14/377,916

(22) PCT Filed: Nov. 1, 2012

(86) PCT No.: PCT/GB2012/052728
§ 371 (c)(1),
(2) Date: Aug. 11, 2014

(87) PCT Pub. No.: WO2013/121164
PCT Pub. Date: Aug. 22, 2013

(65) Prior Publication Data
US 2015/0030934 A1  Jan. 29, 2015

Related U.S. Application Data

(60) Provisional application No. 61/600,048, filed on Feb. 17, 2012.

(30) Foreign Application Priority Data

Feb. 17, 2012  (EP) .................................... 12156009

(51) Int. Cl.
*H01M 4/00* (2006.01)
*H01M 4/134* (2010.01)
(Continued)

(52) U.S. Cl.
CPC .......... *H01M 4/134* (2013.01); *H01M 4/043* (2013.01); *H01M 4/0435* (2013.01); *H01M 4/12* (2013.01);
(Continued)

(58) Field of Classification Search
CPC .......... H01M 4/12; H01M 4/134; H01M 4/74; H01M 4/806
(Continued)

(56) References Cited

U.S. PATENT DOCUMENTS 3,030,720 A  4/1962  Osswald et al.
3,185,590 A  5/1965  Mayer et al.
(Continued)

FOREIGN PATENT DOCUMENTS

CN  1389948  1/2003
EP  0 710 995  5/1996
(Continued)

OTHER PUBLICATIONS

Aurbach et al., "A Short Review of Failure Mechanism of Lithium Metal and Lithiated Graphite Anodes in Liquid Electrolyte Solutions", Solid State Lonics, 2002, vol. 148, p. 405-416.
(Continued)

*Primary Examiner* — Nicholas P D'Aniello
*Assistant Examiner* — Abibatu O Ojo-Amoo
(74) *Attorney, Agent, or Firm* — Meyertons, Hood, Kivlin, Kowert & Goetzel, P.C.; Mark R. DeLuca

(57) ABSTRACT

A metal foil electrode comprising i) a reinforcement layer formed from a porous substrate, and ii) first and second layers of metal foil formed comprising lithium and/or sodium, wherein the reinforcement layer is disposed between the first and second metal foil layers and bonded
(Continued)

US 10,461,316 B2

Page 2

(preferably pressure bonded) together to form a composite structure having a thickness of 100 microns or less.

9 Claims, 1 Drawing Sheet

(51) Int. Cl.
    *H01M 4/04*         (2006.01)
    *H01M 4/12*         (2006.01)
    *H01M 4/66*         (2006.01)
    *H01M 4/74*         (2006.01)
    *H01M 4/80*         (2006.01)
    *H01M 10/052*     (2010.01)
    *H01M 10/0525*    (2010.01)
    *H01M 10/054*     (2010.01)
    *H01M 10/44*      (2006.01)
    *H01M 4/38*         (2006.01)
    *H01M 4/02*         (2006.01)

(52) U.S. Cl.
    CPC .......... *H01M 4/381* (2013.01); *H01M 4/382* (2013.01); *H01M 4/667* (2013.01); *H01M 4/74* (2013.01); *H01M 4/747* (2013.01); *H01M 4/80* (2013.01); *H01M 4/806* (2013.01); *H01M 10/052* (2013.01); *H01M 10/054* (2013.01); *H01M 10/0525* (2013.01); *H01M 10/446* (2013.01); *H01M 2004/021* (2013.01); *Y10T 29/49208* (2015.01)

(58) Field of Classification Search
    USPC ........................................................ 429/231
    See application file for complete search history.

(56) References Cited

U.S. PATENT DOCUMENTS

| | | |
|---|---|---|
| 3,578,500 A | 5/1971 | Maricle et al. |
| 3,639,174 A | 2/1972 | Kegelman |
| 3,721,113 A | 3/1973 | Hovsepian |
| 3,778,310 A | 12/1973 | Garth |
| 3,877,983 A | 4/1975 | Hovsepian |
| 3,907,591 A | 9/1975 | Lauck |
| 3,907,597 A | 9/1975 | Mellors |
| 3,939,010 A | 2/1976 | Coleman et al. |
| 3,951,688 A | 4/1976 | Pankow et al. |
| 4,060,674 A | 11/1977 | Klemann et al. |
| 4,104,451 A | 8/1978 | Klemann et al. |
| 4,118,550 A | 10/1978 | Koch |
| 4,154,906 A | 5/1979 | Bubnick et al. |
| 4,163,829 A | 8/1979 | Kronenberg |
| 4,218,523 A | 8/1980 | Kalnoki-Kis |
| 4,252,876 A | 2/1981 | Koch |
| 4,303,748 A | 12/1981 | Armand et al. |
| 4,318,430 A | 3/1982 | Perman |
| 4,410,609 A | 10/1983 | Peled et al. |
| 4,499,161 A | 2/1985 | Foos |
| 4,503,234 A | 3/1985 | Huwiler et al. |
| 4,503,378 A | 3/1985 | Jones et al. |
| 4,550,064 A | 10/1985 | Yen et al. |
| 4,690,877 A | 9/1987 | Gabano et al. |
| 4,725,927 A | 2/1988 | Morimoto et al. |
| 4,740,436 A | 4/1988 | Kobayashi et al. |
| 5,079,109 A | 1/1992 | Takami et al. |
| 5,219,684 A | 6/1993 | Wilkinson et al. |
| 5,368,958 A | 11/1994 | Hirai et al. |
| 5,460,905 A | 10/1995 | Skotheim |
| 5,462,566 A | 10/1995 | Skotheim |
| 5,523,179 A | 6/1996 | Chu |
| 5,529,860 A | 6/1996 | Skotheim et al. |
| 5,532,077 A | 7/1996 | Chu |
| 5,582,623 A | 12/1996 | Chu |
| 5,587,253 A | 12/1996 | Gozdz et al. |
| 5,648,187 A | 7/1997 | Skotheim |
| 5,744,262 A | 4/1998 | Cheng |
| 5,789,108 A | 8/1998 | Chu |
| 5,797,428 A | 8/1998 | Miller |
| 5,814,420 A | 9/1998 | Chu |
| 5,919,587 A | 7/1999 | Mukherjee et al. |
| 5,961,672 A | 10/1999 | Skotheim et al. |
| 5,962,171 A | 10/1999 | Boguslavsky et al. |
| 6,030,720 A | 2/2000 | Chu et al. |
| 6,051,342 A | 4/2000 | Hamano et al. |
| 6,056,185 A | 5/2000 | Daroux et al. |
| 6,090,504 A | 7/2000 | Sung et al. |
| 6,117,590 A | 9/2000 | Skotheim et al. |
| 6,162,562 A | 12/2000 | Tsuji et al. |
| 6,174,621 B1 | 1/2001 | Skotheim et al. |
| 6,201,100 B1 | 3/2001 | Gorkovenko et al. |
| 6,210,831 B1 | 4/2001 | Gorkovenko et al. |
| 6,245,465 B1 | 6/2001 | Angell et al. |
| 6,302,928 B1 | 10/2001 | Xu et al. |
| 6,319,633 B1 | 11/2001 | Ikeda et al. |
| 6,344,293 B1 | 2/2002 | Geronov |
| 6,358,643 B1 | 3/2002 | Katz |
| 6,376,123 B1 | 4/2002 | Chu |
| 6,524,742 B1 | 2/2003 | Emanuel et al. |
| 6,537,704 B1 | 3/2003 | Akashi et al. |
| 6,544,691 B1 | 4/2003 | Guidotti |
| 6,613,480 B1 | 9/2003 | Hwang et al. |
| 6,632,573 B1 | 10/2003 | Nimon et al. |
| 6,706,449 B2 | 3/2004 | Mikhaylik et al. |
| 6,733,924 B1 | 5/2004 | Skotheim et al. |
| 6,797,428 B1 | 9/2004 | Skotheim et al. |
| 7,108,942 B1 | 9/2006 | Gan et al. |
| 7,250,233 B2 | 7/2007 | Choi et al. |
| 7,335,440 B2 | 2/2008 | Aamodt et al. |
| 7,354,680 B2 | 4/2008 | Mikhaylik et al. |
| 2001/0008736 A1 | 7/2001 | Fanta et al. |
| 2001/0019797 A1 | 9/2001 | Kezuka et al. |
| 2002/0022181 A1 | 2/2002 | Tsujioka et al. |
| 2002/0034688 A1 | 3/2002 | Chu et al. |
| 2002/0039677 A1 | 4/2002 | Iwamoto et al. |
| 2002/0045101 A1 | 4/2002 | Hwang et al. |
| 2002/0045102 A1 | 4/2002 | Jung et al. |
| 2002/0102466 A1 | 8/2002 | Hwang et al. |
| 2002/0160263 A1 | 10/2002 | Corrigan et al. |
| 2002/0168574 A1 | 11/2002 | Ahn et al. |
| 2002/0192557 A1 | 12/2002 | Choi et al. |
| 2003/0073005 A1 | 4/2003 | Kim et al. |
| 2003/0157411 A1 | 8/2003 | Jung et al. |
| 2003/0175596 A1 | 9/2003 | Park et al. |
| 2003/0180611 A1 | 9/2003 | Mikhaylik et al. |
| 2003/0190530 A1 | 10/2003 | Yang et al. |
| 2003/0232244 A1 | 12/2003 | Birke et al. |
| 2004/0002002 A1 | 1/2004 | Mitzuta et al. |
| 2004/0028999 A1 | 2/2004 | LaLiberte |
| 2004/0029014 A1 | 2/2004 | Hwang |
| 2004/0048164 A1 | 3/2004 | Jung et al. |
| 2004/0053129 A1 | 3/2004 | Jung et al. |
| 2004/0072066 A1 | 4/2004 | Cho et al. |
| 2004/0091776 A1 | 5/2004 | Hwang |
| 2004/0096744 A1 | 5/2004 | Sadamitsu et al. |
| 2004/0096750 A1 | 5/2004 | Kim et al. |
| 2004/0101753 A1 | 5/2004 | Hwang |
| 2004/0137330 A1 | 7/2004 | Lee et al. |
| 2004/0157132 A1 | 8/2004 | Kim et al. |
| 2004/0179328 A1 | 9/2004 | Ando et al. |
| 2004/0219428 A1 | 11/2004 | Nagayama |
| 2004/0222768 A1 | 11/2004 | Moore et al. |
| 2004/0258996 A1 | 12/2004 | Kim et al. |
| 2005/0017684 A1 | 1/2005 | Brecht |
| 2005/0136327 A1 | 6/2005 | Miyake et al. |
| 2005/0156575 A1 | 7/2005 | Mikhaylik |
| 2005/0175903 A1 | 8/2005 | Kim et al. |
| 2005/0221192 A1 | 10/2005 | Hennige et al. |
| 2005/0238956 A1 | 10/2005 | Lee |
| 2005/0244693 A1 | 11/2005 | Strutt et al. |
| 2006/0024579 A1 | 2/2006 | Kolosnitsyn et al. |
| 2006/0051643 A1 | 3/2006 | Sarkar et al. |
| 2006/0105233 A1 | 5/2006 | Morita |
| 2006/0121355 A1 | 6/2006 | Kolosnitsyn et al. |

(56) References Cited

U.S. PATENT DOCUMENTS

| | | |
|---|---|---|
| 2006/0177741 A1 | 8/2006 | Kolosnitsyn et al. |
| 2006/0204856 A1 | 9/2006 | Ryu et al. |
| 2006/0208701 A1 | 9/2006 | Mikhaylik |
| 2006/0234126 A1 | 10/2006 | Kolosnitsyn et al. |
| 2006/0238203 A1 | 10/2006 | Kelley et al. |
| 2006/0292451 A1 | 12/2006 | Lee et al. |
| 2007/0072076 A1 | 3/2007 | Kolosnitsyn et al. |
| 2007/0281210 A1 | 12/2007 | Kolosnitsyn et al. |
| 2008/0038645 A1 | 2/2008 | Kolosnitsyn et al. |
| 2008/0060189 A1 | 3/2008 | Daidoji et al. |
| 2008/0100264 A1 | 5/2008 | Kolosnitsyn et al. |
| 2008/0160407 A1 | 7/2008 | Ishii et al. |
| 2008/0193835 A1 | 8/2008 | Mikhaylik et al. |
| 2009/0027831 A1* | 1/2009 | Tasaki ............... H01M 4/0404 361/523 |
| 2009/0053565 A1 | 2/2009 | Iacovelli |
| 2009/0111029 A1 | 4/2009 | Lee et al. |
| 2009/0246626 A1 | 10/2009 | Tasaki et al. |
| 2009/0317717 A1 | 12/2009 | Ryu et al. |
| 2010/0129724 A1 | 5/2010 | Kolosnitsyn et al. |
| 2010/0231168 A1 | 9/2010 | Kolosnitsyn et al. |
| 2010/0261048 A1 | 10/2010 | Kim et al. |
| 2010/0273048 A1 | 10/2010 | Machida et al. |
| 2011/0059361 A1 | 3/2011 | Wilkening et al. |
| 2011/0123866 A1 | 5/2011 | Pan et al. |
| 2011/0151317 A1 | 6/2011 | Giroud et al. |
| 2011/0165466 A1* | 7/2011 | Zhamu ............... B82Y 30/00 429/231.8 |
| 2012/0282530 A1 | 11/2012 | Chiang et al. |
| 2012/0293114 A1 | 11/2012 | Murochi et al. |
| 2012/0315553 A1 | 12/2012 | Fuminori et al. |
| 2013/0011717 A1 | 1/2013 | Yotsumoto |
| 2013/0187466 A1 | 7/2013 | Sakai et al. |
| 2013/0307485 A1 | 11/2013 | He et al. |
| 2014/0009117 A1 | 1/2014 | Ishii et al. |
| 2014/0079989 A1 | 3/2014 | Janakiraman et al. |
| 2014/0272610 A1 | 9/2014 | Amine et al. |
| 2014/0377667 A1 | 12/2014 | Roschenthaler et al. |
| 2015/0084093 A1 | 3/2015 | Thillaiyan et al. |
| 2015/0147656 A1 | 5/2015 | Kogetsu et al. |
| 2015/0234014 A1 | 8/2015 | Moganty et al. |

FOREIGN PATENT DOCUMENTS

| | | |
|---|---|---|
| EP | 0 764 489 | 3/1997 |
| EP | 0 924 783 | 6/1999 |
| EP | 1 176 659 | 1/2002 |
| EP | 1 178 555 | 2/2002 |
| EP | 1320143 | 6/2003 |
| EP | 1400996 | 3/2004 |
| EP | 1 420 475 | 5/2004 |
| EP | 1865520 | 12/2007 |
| EP | 1 962 364 | 8/2008 |
| EP | 2 023 461 | 2/2009 |
| EP | 2 026 402 | 2/2009 |
| EP | 2 259 376 | 12/2010 |
| FR | 2991104 | 11/2013 |
| GB | 2084391 | 4/1982 |
| GB | 2200068 | 7/1988 |
| GB | 2430542 | 3/2007 |
| JP | 59-194361 | 11/1984 |
| JP | 63-081767 | 4/1988 |
| JP | 64-107467 | 4/1989 |
| JP | 01-124969 | 5/1989 |
| JP | 04-217826 | 8/1992 |
| JP | 06-343233 | 12/1994 |
| JP | 08-069812 | 3/1996 |
| JP | 08-138650 | 5/1996 |
| JP | 08-138742 | 5/1996 |
| JP | 08-298229 | 11/1996 |
| JP | 08-298230 | 11/1996 |
| JP | 09-027328 | 1/1997 |
| JP | 09-147913 | 6/1997 |
| JP | 10-284076 | 10/1998 |
| JP | H11-067261 | 3/1999 |
| JP | 11-273729 | 10/1999 |
| JP | 2001-167751 | 6/2001 |
| JP | 2002-075446 | 3/2002 |
| JP | 2002-252036 | 9/2002 |
| JP | 2005-071641 | 3/2005 |
| JP | 2005-108523 | 4/2005 |
| JP | 2005-108724 | 4/2005 |
| JP | 2005-005215 | 6/2005 |
| JP | 2005-243342 | 9/2005 |
| JP | 2006134785 | 5/2006 |
| JP | 2007-173615 | 7/2007 |
| JP | 2009-087728 | 4/2009 |
| JP | 2009-187674 | 8/2009 |
| JP | 2010-251197 | 11/2010 |
| JP | 2010262864 | 11/2010 |
| JP | 2011-108469 | 6/2011 |
| JP | 2011-124024 | 6/2011 |
| JP | 2011-192574 | 9/2011 |
| JP | 2013-042598 | 2/2013 |
| KR | 10-2002-0089134 | 11/2002 |
| KR | 10-2003-0368753 | 4/2003 |
| KR | 10-2003-0056497 | 7/2003 |
| KR | 10-2011-0024707 | 3/2011 |
| WO | 2001-047088 | 6/2001 |
| WO | 2001-097304 | 12/2001 |
| WO | 2002-095849 | 11/2002 |
| WO | 2006-050117 | 5/2006 |
| WO | 2007-111988 | 10/2007 |
| WO | 2007-132994 | 11/2007 |
| WO | 2013-045561 | 4/2013 |

OTHER PUBLICATIONS

Bates et al., "Solvent Effects on Acid-Base Behavior: Five Uncharged Acids in Water-Sulfolane Solvents", 1976, Journal of Solution Chemistry, vol. 5, No. 3, p. 213-222.

Changes et al., "Butyrolactone-Ethylene Carbonate Based Electrolytes for Lithium Ion Batteries", Jul. 2003, Journal of Applied Electrochemistry, 33, p. 589-595.

Chang et al., "Binary Electrolyte Based on Tetra (ethylene glycol) Dimethyl Ether and 1,3-dioxolane for Lithium-Sulphur Battery", J. Power Sources, 2002, vol. 112, p. 452-460.

Cowie et al. "Ion Conduction in Macroporous Polyethylene Film Doped With Electrolytes" Solid State Ionics 109(1998) 139-144.

Fujinaga et al. "Electrochemical Reduction of Elemental Sulphur in Acetonitrile", Bull Chem. Soc. Jpn. 1980, vol. 63, p. 2851-2855.

Jeon et al. Solvent-Free Polymer Electrolytes Based on Thermally Annealed Porous P(VdF-HFP)/P(EO-EC) Membranes.

Kolosnitsyn "Physicochemical and Electrochemical Properties of Sulfolane Solutions of Lithium Salts", Russian Journal of Electrochemistry, May 2008, vol. 44(5), p. 575-578.

Komaba et al., "Inorganic Electrolyte Additives to Supress the Degradation of Graphite Anodes by Dissolved Mn(II) for Lithium Ion Batteries", Mar. 2003, Journal of Power Sources, 1190121, p. 378-382.

Levillain et al., "On the Understanding of the Reduction of Sulphur (S8) in Dimethylformamide (DMF)", J. of Electroanalytical Chemistry, 1997, vol. 420, p. 167-177.

Nazri et al., "Lithium Batteries: Science and Technology", 2003, p. 509-573, Hardcover, ISBN: 978-1-4020-7628-2.

Paris et al. "Electrochemical Reduction of Sulphur in Dimethylacetamide", Electrochimica Acta, 1981, vol. 26, No. 12, g. 1823-1829.

Peled et al., "Rechargeable Lithium-Sulphur Battery (extended abstract)", J. of Power Sources, 1989, vol. 26, p. 269-271.

Peled et al., "Lithium-Sulphur Battery: Evaluation of Dioxolane-Based Electrolytes", J. Electrochem Soc., 1989, vol. 136, No. 6, p. 1621-1625.

Rauh et al., "Formation of Lithium Polysulphides in Aprotic Media", J. Inorg. Nucl Chem, 1977, vol. 39, p. 1761-1766.

Rauh et al., "A Lithium/Dissolved Sulphur Battery with an Organic Electrolyte", J. Electrochem Soc., 1979, vol. 126, No. 4, p. 523-527.

(56) References Cited

OTHER PUBLICATIONS

Suo et al. "A New Class of Solvent-in-Salt Electrolyte for High-Energy Rechargeable Metallic Lithium Batteries" Nature Communications, 2013, vol. 4, p. 1481.
Tobishima et al., "Study on the Reduction Species of Sulphur by Alkali Metals in Nonaqueous Solvents", Electrochimica Acta, 1997, vol. 42, No. 6, p. 1019-1029.
Ultralife Batteries Inc. "Transportation Regulations for Lithium, Lithium Ion and Polymer Cells and Batteries", Rev. H, Dec. 18, 2003.
Yamin et al., "Electrochemistry of a Nonaqueous Lithium/Sulphur Cell", J of Power Sources, 1983, vol. 9, p. 281-287.
Yamin et al., "The Electrochemical Behavior of Polysulphides in Tetrahydrofuran", J. of Power Sources, 1985, vol. 14, p. 129-134.
Yamin et al., "Lithium Sulphur Battery Oxidation/Reduction Mechanisms of Polysulphides in THF Solution", J. Electrochem Soc. 1988, vol. 135, No. 5, p. 1045-1048.
Office Action, U.S. Appl. No. 11/290,825, dated Jun. 11, 2009.
Office Action, U.S. Appl. No. 11/526,876, dated Oct. 30, 2009.
Office Action, U.S. Appl. No. 11/190,203, dated Apr. 3, 2009.
Office Action, U.S. Appl. No. 11/190,203, dated Oct. 9, 2009.
Office Action, U.S. Appl. No. 11/332,471, dated Aug. 21, 2007.
Office Action, U.S. Appl. No. 11/332,471, dated Feb. 20, 2007.
Office Action, U.S. Appl. No. 11/332,471, dated Sep. 28, 2007.
Office Action, U.S. Appl. No. 11/332,471, dated Mar. 11, 2008.
Office Action, U.S. Appl. No. 11/332,471, dated Aug. 27, 2008.
Office Action, U.S. Appl. No. 11/332,471, dated Feb. 26, 2009.
Office Action, U.S. Appl. No. 11/332,471, dated Jul. 31, 2009.
Office Action, U.S. Appl. No. 11/386,113, dated Jan. 6, 2009.
Office Action, U.S. Appl. No. 11/386,113, dated Aug. 19, 2008.
Office Action, U.S. Appl. No. 11/386,113, dated Feb. 5, 2008.
Office Action, U.S. Appl. No. 11/889,334, dated Aug. 14, 2009.
UK Search Report, Application No. GB 0416708.6, Section 17, dated Aug. 10, 2004.
UK Search Report, Application No. GB 0501001.2, dated Apr. 14, 2005.
Japanese Office Action for JP Application No. 2007-550839 dated Apr. 1, 2014.
Korean Office Action for Application No. 10-2013-7031637, dated Jan. 27, 2014.
International Search Report, Application No. PCT/GB2005/002850, dated Aug. 25, 2005.
Written Opinion, Application No. PCT/GB2005/002850, dated Aug. 25, 2005.
International Preliminary Report on Patentability, Application No. PCT/GB2005/002850, dated Jan. 30, 2007.
International Search Report, Application No. PCT/GB2006/000103, dated Jun. 20, 2007.
Written Opinion, Application No. PCT/GB2006/000103, dated Jun. 20, 2007.
International Preliminary Report on Patentability, Application No. PCT/GB2006/000103, dated Jul. 24, 2007.
International Search Report, Application No. PCT/GB2006/050300, dated Dec. 6, 2006.
Written Opinion, Application No. PCT/GB2006/050300, dated Dec. 6, 2006.
International Preliminary Report on Patentability, Application No. PCT/GB2006/050300, dated Mar. 26, 2008.
International Search Report / Written Opinion for PCT Application No. PCT/GB2012/052728 dated Jan. 2, 2013.
International Search Report, PCT Application No. PCT/GB2012/051633, dated Feb. 1, 2013.
Written Opinion, PCT Application No. PCT/GB2012/051633, dated Feb. 1, 2013.
International Preliminary Report on Patentability, PCT Application No. PCT/GB2012/052728, dated Aug. 19, 2014.
International Search Report, Application No. PCT/GB2014/05088, dated Jul. 7, 2014.
Written Opinion, Application No. PCT/GB2014/05088, dated Jul. 7, 2014.
International Preliminary Report on Patentability, Application No. PCT/GB2014/050888, dated Sep. 29, 2015.
International Search Report, Application No. PCT/GB2014/050890, dated Jun. 2, 2014.
Written Opinion, Application No. PCT/GB2014/050890, dated Jun. 2, 2014.
International Preliminary Report on Patentability, Application No. PCT/GB2014/050890, dated Sep. 29, 2015.
International Search Report, Application No. PCT/GB2014/050891, dated Jul. 24, 2014.
Written Opinion, Application No. PCT/GB2014/050891, dated Jul. 24, 2014.
International Preliminary Report on Patentability, Application No. PCT/GB2014/050891, dated Sep. 29, 2015.
International Search Report, Application No. PCT/GB2014/052474, dated Nov. 5, 2014.
Written Opinion, Application No. PCT/GB2014/052474, dated Nov. 5, 2014.
International Preliminary Report on Patentability, Application No. PCT/GB2014/052474, dated Feb. 16, 2016.
International Search Report, Application No. PCT/GB2014/053715, dated Feb. 27, 2015.
Written Opinion, Application No. PCT/GB2014/053715, dated Feb. 27, 2015.
International Preliminary Report on Patentability, Application No. PCT/GB2014/053715, dated Jun. 21, 2016.
International Search Report, Application No. PCT/GB2014/053719, dated Feb. 24, 2015.
Written Opinion, Application No. PCT/GB2014/053719, dated Feb. 24, 2015.
International Preliminary Report on Patentability, PCT Application No. PCT/GB2012/051633, dated Jun. 17, 2014.
Great Britain Search Report for GB Patent Application No. 1219695.2, dated Nov. 20, 2012.

\* cited by examiner

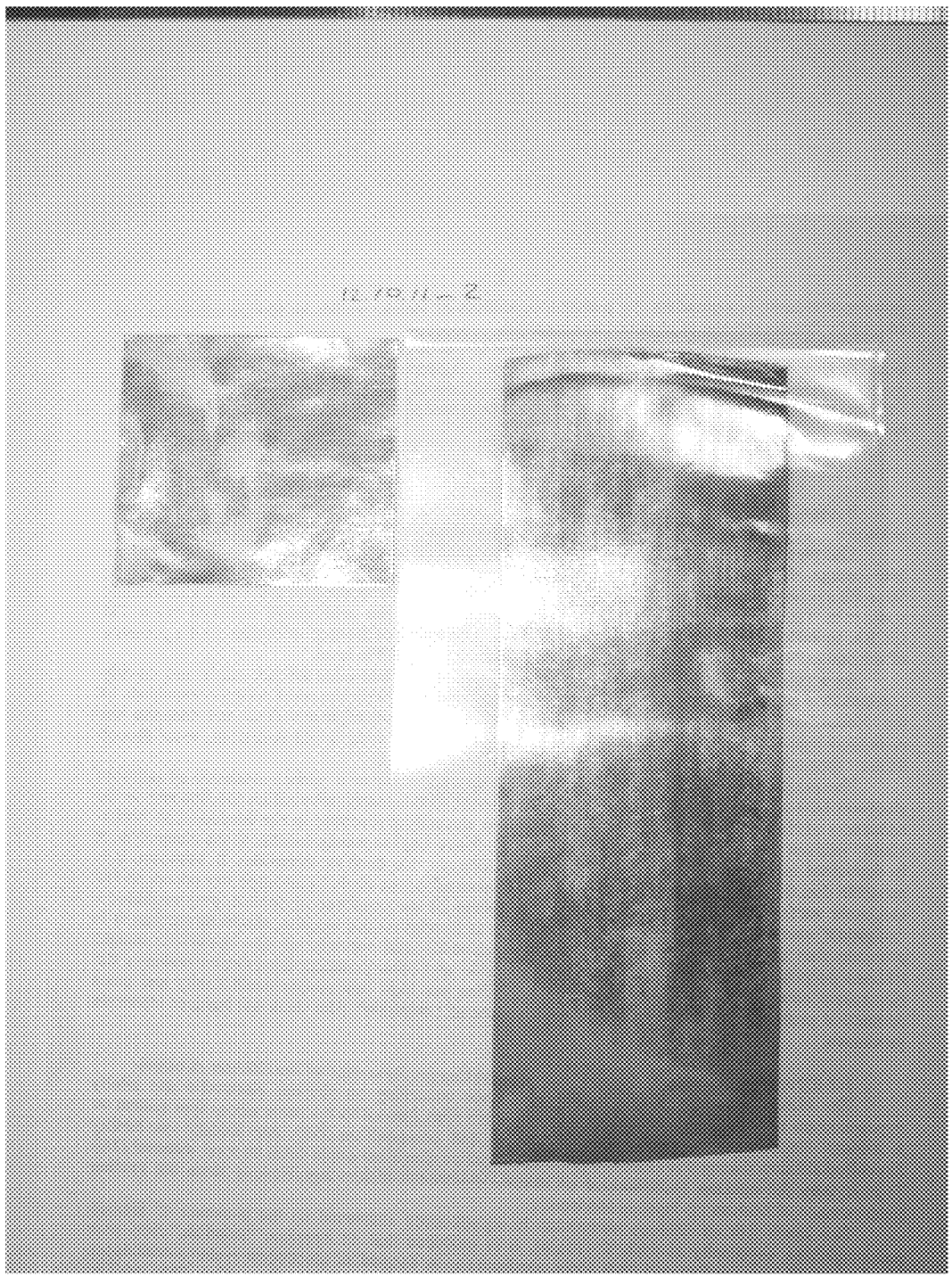

REINFORCED METAL FOIL ELECTRODE

The present invention relates to a metal foil electrode and, in particular but not exclusively, to a lithium foil electrode.

BACKGROUND

Metal foils of, for example, metallic lithium have been used in both primary and secondary electrochemical cells. In a lithium-sulphur cell, for instance, lithium metal foil may be used as the anode of the cell.

In order to improve the specific energy of, for example, a lithium-sulphur cell, it is desirable to reduce its overall mass. In theory, this may be achieved by reducing the thickness of the electrodes since the electrochemical reactions during charge and discharge only occur at the surface of the electrode. Thin lithium foil, however, is very soft and is easily bent and/or torn. When such foils are cut for use, the foils also have a tendency to stick to the blades used in the cutting procedure. As a result, thin lithium foils are extremely difficult to handle and produce. In fact, the typical thickness of commercially available lithium foil is 100 µm or greater.

It is known from U.S. Pat. No. 3,721,113 to provide a process for rolling thin continuous lithium strips in thicknesses less than 400 µm by cold rolling lithium metal while it is compressed between smooth surfaces of a solid polymeric composition. It is stated that thicknesses down to about 40 µm are achievable but this is not exemplified. The solid polymeric composition may be in the form of the surfaces of a pair of rollers, or may be a pair of polymer sheets that sandwich a strip of lithium. It is important to appreciate, however, that the polymer sheets are peeled away from the lithium foil after cold rolling, and are not intended to act as a support in order to improve subsequent handling. Accordingly, although the metal lithium foils disclosed in this document may be thin, they are difficult to work with once produced.

US 2009/0246626 describes a lithium ion cell in which lithium metal foil is used as a source of lithium ions. In particular, US 2009/0246626 describes a lithium ion cell comprising positive electrodes and negative electrodes formed from carbon. To initialize the cell, the negative electrodes are first doped with lithium ions from the lithium metal foil. Specifically, the lithium metal foil is placed in electrical contact with the negative electrodes in the presence of an electrolyte. After a period of time, the lithium metal foil completely dissolves to form lithium ions which intercalate or dope the negative electrodes. Once dissolved, therefore, the metal foil plays no part in the cell's charge and discharge chemistry.

US 2009/0246626 recognises the difficulties inherent in handling thin lithium foils, and proposes a lithium metal foil provided on one side or on both sides with a support member formed of paper or resin non-woven fabric that is adhesive or pressure bonded to the lithium foil. The reference, however, is not concerned with reducing the thickness of a lithium foil. Instead, the reference states that the thickness is not limiting and is determined by the amount of lithium ions doped into the cell and the area of the lithium metal foil. Since a single sheet of lithium foil may be used to intercalate or dope a series of electrodes in a stack, a thickness of 50 to 300 microns is said to be preferred. Although the thickness of the support member is said to be preferably 20 to 100 microns, the reference does not disclose the thicknesses of any bonded structures. In fact, although pressure bonding is mentioned, this need not result in firm fixation but may merely be sufficient to ensure that the foil and support member are not misaligned during subsequent cutting and handling. There is no suggestion that any reduction in thickness can be achieved by using a composite structure. Indeed, the addition of a support would be expected to increase the thickness of the resulting composite.

EP 1865520 describes a lithium electrode formed by contact bonding a sheet of lithium metal to stainless steel net. The prior art document mentions the possibility of applying a sheet of lithium metal to either side of the current collector. However, EP 1865520 does not describe the step of rolling or otherwise pressing and stretching the composite to substantially reduce its overall thickness. Indeed, the Example describes an electrode having a thickness of 148 µm that is formed by contact bonding a single sheet of lithium metal to a stainless steel net. It should also be noted that the lithium electrode described in EP 1865520 is not employed as the working anode of the electrochemical cell but simply as a source of lithium ions for an anode formed, for example, of graphite for reversibly intercalating lithium ions. Moreover, since the stainless steel net is used as a current collector, it is necessarily conducting. On exposure to electrolyte, therefore, it may become a centre for dendrite formation. This is generally undesirable.

US 2004/0072066 describes a lithium electrode that is formed by depositing a lithium metal layer onto a porous polymer film using, for example, vapour deposition. The porous polymer film is present on and integrated with the electrolyte-facing surface of the lithium electrode. A protective coating layer having lithium ion conductivity but that is impermeable to electrolyte may be provided between the porous polymer film and the lithium metal layer. The aim of US 2004/0072066 is to provide layers over the surface of the lithium metal electrode.

In view of the foregoing, it is among the objects of the present invention to improve the specific energy of an electrochemical cell.

It is also among the objects of the present invention to reduce the thickness of a metal foil electrode.

BRIEF DESCRIPTION OF THE DRAWINGS

Advantages of the present invention will become apparent to those skilled in the art with the benefit of the following detailed description of embodiments and upon reference to the accompanying drawings in which:

FIG. 1 is a photograph of a lithium/polypropylene composite before and after rolling.

While the invention may be susceptible to various modifications and alternative forms, specific embodiments thereof are shown by way of example in the drawings and will herein be described in detail. The drawings may not be to scale. it should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

BRIEF SUMMARY OF THE DISCLOSURE

Viewed from a first aspect, the present invention provides a metal foil electrode comprising
 i) a reinforcement layer formed from a porous substrate, and
 ii) first and second layers of metal foil comprising lithium and/or sodium, wherein the reinforcement layer is disposed between the first and second metal foil layers and pressure bonded together to form a composite structure having a thickness of 100 microns or less (e.g. less than 100 microns).

Preferably, the porous substrate is devoid of metal. Preferably, the porous substrate is formed from a non-conducting material. The porous substrate may be formed from a fibrous material, such as a fibrous non-conducting material. In a preferred embodiment, the fibrous material is a material formed from polymer fibres.

Preferably, the composite structure of the metal foil electrode has a thickness of 60 microns or less, more preferably 50 microns or less.

Preferably, the metal foil is formed from lithium metal or sodium metal or an alloy containing lithium metal or sodium metal. Lithium metal or lithium alloy are preferred. Examples of suitable lithium alloys include lithium-tin, lithium-aluminium, lithium-magnesium, lithium-silver, lithium-lead, lithium-manganese and/or lithium-cadmium alloys.

The electrode may include a connection terminal. The electrode may consist essentially of the composite structure and, optionally, a connection terminal.

Viewed from a second aspect, the present invention provides a method of forming a metal foil electrode, which comprises:

providing a reinforcement layer formed from a porous substrate, providing a first and second layers of metal foil comprising lithium and/or sodium, placing the reinforcement layer between said first and second layers of metal foil, and applying pressure to bond the layers together to form a composite structure, whereby the thickness of the composite structure is at least 25% less than the sum of the initial thicknesses of the reinforcement layer, first layer of metal foil and second layer of metal foil.

The thickness of the composite structure is preferably at least 50% less than the sum of the initial thicknesses of the reinforcement layer, first layer of metal foil and second layer of metal foil.

In one embodiment, the thickness of the composite structure is less than the sum of the initial thicknesses of the first layer of metal foil and second layer of metal foil. In another embodiment, the thickness of the composite structure is less than the initial thickness of the first layer of metal foil or the second layer of metal foil.

Once bonded, the composite structure may be cut for use as a metal foil electrode.

As discussed above, the metal foil electrode may be formed by pressure bonding. The term "pressure bonding" implies that the bond is a direct bond between the bonded entities that is formed by pressure alone and not via the use of, for example, an adhesive (i.e. bonded in the absence of an adhesive). Suitable pressures range from 100N to 4000 kN, preferably 1 kN to 1000 kN or more preferably 10 kN to 100 kN. A composite that is formed by pressure bonding is generally distinguishable from one formed by other bonding techniques by, for example, the lack of an adhesive layer.

In an embodiment of the present invention, pressure may be applied to bond and compress the reinforcement layer and first and second metal foil layers together to form a composite structure, whereby the thickness of the composite structure is less than the sum of the initial thicknesses of the reinforcement layer, first layer of metal foil and second layer of metal foil. Accordingly, the pressure bonding step not only bonds the layers together but also reduces (preferably substantially reduces) the thickness of the overall the structure. The reinforcement layer helps to maintain the structural integrity of the structure during the bonding step. It also improves the handling of the composite once formed by adding strength to the overall structure. Accordingly, the resulting metal foil electrode has sufficient stiffness to allow it to be handled relatively easily and with a reduced risk of the foil folding or curling back on itself, breaking or tearing.

Preferably, the pressure bonding steps causes the metal to flow into the pores of the porous substrate such that there is metal to metal contact through the pores of reinforcement layer. This metal-to-metal contact improves the nature of the bond across the reinforcement substrate and, hence, across the composite structure.

The pressure bonding step may be achieved by simple pressing or, preferably, calendaring. In a preferred embodiment, the layers are pressed together between rollers one or more times, for example, 2 to 10 times, preferably, 3 to 6 times, more preferably, 4 to 5 times. Advantageously, the perforations in the reinforcement layer enable it to stretch with the metal foil layers as they are compressed and thinned. It will be appreciated that the surface area of each metal foil layer will increase as it is compressed and thinned, rather in the manner of pastry dough when it is rolled. The reinforcement layer and first and second layers of metal foil are preferably calendared together in a single step to form the composite structure. The resulting composite structure may then be calendared a further one or more times, as desired.

Where a calendaring step is used, the rollers are typically selected to have low adhesion to the lithium or sodium. The rollers may be made of glass, ceramics, granite, basalt, jasper or other minerals. The pressure applied to the rolls will depend on their diameter.

A sheet of material, such as polypropylene, may be used to line the rollers to prevent the composite from sticking to the rollers.

The pressure bonding step may be carried out at room temperature or at an elevated temperature of, for example, up to 180 degrees C. Suitable temperatures range from 20 to 160 degrees C., preferably 60 to 120 degrees C. If the metal foil is heated, it may soften, allowing it to flow more readily during the pressure bonding step. This may cause the metal to flow more readily into the pores of the reinforcement layer/substrate, facilitating metal-to-metal contact across the reinforcement layer/substrate and strengthening the bond across the composite structure. The pressure bonding step is preferably carried out at a temperature less than 50 degrees C., preferably less than 30 degrees C., for example, less than 20 degrees C. below the melting point of the metal foil. Where the metal foil is a lithium metal foil, the pressure bonding step may be carried out at a temperature of up to 180 degrees C., for example, from 130 to 180 degrees, preferably 160 to 180 degrees C. Where the metal foil is a sodium metal foil, the pressure bonding step may be carried out at a temperature of up to 98 degrees C., for example, from 40 to 98 degrees C., preferably 60 to 98 degrees C. The pressure bonding step is advantageously carried out at a reduced water vapour atmosphere, preferably a dry atmosphere and/or inert atmosphere.

Pressures of 100N to 4000 kN, preferably 1 kN to 1000 kN or more preferably 10 kN to 100 kN may be applied to bond the layers.

Advantageously, the reinforcement layer is adjacent and in direct contact with the first and second metal foils layers. Preferably, the layers may be pressure bonded together such that the pores or perforations in the reinforcement layer are at least partially filled with metal from the first and/or second metal foil layers. As such, the first and second metal foil layers may contact each other through the pores or perforations. Advantageously, this can strengthen the bond between the layers, providing an integral structure.

As discussed above, the metal foil layer may be formed of lithium and/or sodium (e.g. metal or alloy). These metals/alloys are preferably plastic and are able to deform plastically under applied pressure. Preferably, lithium metal or lithium alloy is used.

The metal foil layer may have an initial thickness of 5 to 500 microns, preferably 50 to 400 microns, more preferably 80 to 300 microns, for example 100 to 200 microns. Once bonded as part of the composite, each metal foil layer may have a thickness that is, for example, at least 25% less, preferably at least 50% less, more preferably at least 75% less than its initial thickness. Exemplary thicknesses range from 5 to 60 microns, for example, 20 to 50 microns. The metal foil layers placed on either side of the reinforcement layer may or may not have the same initial thicknesses.

The reinforcement layer may be formed of any suitable porous substrate. The reinforcement layer may consist essentially or consist exclusively of the porous substrate. The substrate may be formed from an inherently porous material. Alternatively or additionally, pores may be introduced into the substrate, for example, by perforating the substrate by mechanical means. Suitable substrates are chemically inert and preferably have the ability to deform plastically under pressure. This is important because the electrode of the present invention is formed by placing the reinforcement layer between two sheets of metal foil and then applying pressure to stretch the resulting composite, for example, by calendaring. During and after this stretching step, it is important for the reinforcement to retain its structural integrity and mechanical strength. Advantageously, the reinforcement layer is formed from a fibrous material (i.e. a material formed from fibres). The fibrous material may be a woven or non-woven material. The fibrous material is preferably formed from fibres of a non-conducting material, such as polymer fibres. Advantageously, the fibres deform plastically under pressure while maintaining their integrity and mechanical strength. Examples include non-woven fabric, woven fabric and mesh (e.g. polymer mesh). Suitable fabrics include polymer fabrics, such as polyalkylene fabrics, polyamides (capron), and nylon. Polypropylene fabric is preferred. Polypropylene non-woven is most preferred. Non-metal and/or non-conducting reinforcement layers are particularly preferred. Without wishing to be bound by any theory, this is because any metal or conducting reinforcing materials can become exposed to the electrolyte during cycling of the cell and become a centre for dendrite growth.

In a preferred embodiment the reinforcement layer may have or may be formed of a material that has a density of less than 6 g/cm$^3$, preferably less than 4 g/cm$^3$, more preferably less than 2 g/cm$^3$, and even more preferably less than 1.5 g/cm$^3$. In one embodiment, the reinforcement layer may have or may be formed from a material that has a density of at least 0.5 g/cm$^3$, preferably at least 0.7 g/cm$^3$, more preferably at least 0.8 g/cm$^3$ and even more preferably at least 0.9 g/cm$^3$. In a preferred embodiment, the reinforcement layer has a density of 1 to 1.2 g/cm$^3$. By using a material having a relatively low density, the overall mass of the cell may be reduced, improving the cell's specific energy.

The reinforcement layer is preferably a non-conductor. Preferably, the reinforcement layer has or is formed from a material having an electrical resistivity (Ohm·m) at 20 degrees C. of at least 100, preferably at least $1 \times 10^5$, more preferably at least $1 \times 10^{10}$, yet more preferably at least $1 \times 10^{12}$, even more preferably at least $1 \times 10^{14}$ Ohm·m at 20 degrees C. For example, the reinforcement layer has or is formed from a material having an electrical resistivity the at least $1 \times 10^{14}$, preferably at least $1 \times 10^{16}$ Ohm·m at 20 degrees C.

The substrate (reinforcement layer) may have pores (or perforations) with an initial average size of 1 to 300 microns, preferably 100 to 200 microns. These pores typically increase in size, for example, when the substrate is pressure bonded, in particular, by calendaring.

The reinforcement layer may have an initial thickness of 5 to 500 microns, preferably 50 to 400 microns, more preferably 80 to 300 microns, for example 100 to 200 microns. Once bonded as part of the composite, the reinforcement layer may have a thickness that is, for example, at least 25% less, preferably at least 50% less, more preferably at least 75% less than its initial thickness. Exemplary thicknesses range from 5 to 60 microns, for example, 20 to 50 microns.

The sum of the initial thicknesses of the reinforcement layer and first and second metal foil layers may be 50 to 1500 microns, preferably 100 to 800 microns. Once bonded, the composite may a thickness of less than 100 microns, for example, 20 to 60 microns. In one embodiment, the sum of the initial thicknesses of the reinforcement layer and first and second metal foil layers is 200 microns and, once bonded, this is reduced to 50 microns. Preferably, the thickness of the bonded composite is 30 to 80 microns, more preferably 40 to 60 microns.

During cell assembly, a separator may be placed in contact with one or both faces of the metal foil electrode. Where used, the separator is preferably not bonded (e.g. not pressure bonded) to the surface of the metal foil electrode. In one embodiment, there is provided an electrode assembly comprising an anode, a cathode and a separator positioned therebetween, wherein the anode is the metal foil electrode described above. An electrolyte may be present between the anode and cathode. The separator may be in physical contact with the anode and/or cathode. However, it is preferably not bonded e.g. pressure bonded to the surface of the metal foil electrode. The electrode assembly or stack of electrode assemblies may be sealed in a casing, with connection terminals of the electrodes accessible for application of a potential difference across the anode(s) and cathode(s).

According to a further aspect of the present invention, there is provided an electrochemical cell comprising a metal foil electrode as described above.

The electrochemical cell may be a primary cell. Preferably, however, the electrochemical cell is a secondary cell.

The electrochemical cell may include the metal foil electrode as the anode of the cell. Where the electrochemical cell includes more than one anode, all of the anodes of the cell may be formed of the metal foil electrode.

The electrochemical cell may include at least one anode and at least one cathode in an electrolyte. The anode is preferably the metal foil electrode described above. The cell may include a plurality of anodes and a plurality of cathodes. Preferably all the anodes of the cell are formed of the metal foil electrode. A separator may be placed in between the anode and the cathode. The separator may be in contact with the anode and/or the cathode but is preferably not bonded e.g. pressure bonded to the anode and/or cathode. The cell may be sealed in a housing, with the terminal of at least one of the anodes and at least one of the cathodes accessible for charge and/or discharge of the cell.

Where used, the separator may be formed of an electrically insulating material. Examples include polyethylene, polypropylene, polyamides, woven glass fabric etc.

The metal foil electrode may be an electrode used in any suitable lithium battery. Examples of suitable lithium batteries include those having cathodes based on transition metal compounds, such as transition metal oxides, sulphides or halides. Specific examples include Li—$MnO_2$ and Li—$FeS_2$ cells. Other examples include lithium cells in which the cathode is based on sulphur dioxide, thionyl chloride, sulfuryl chloride, halogen (e.g. iodine) and carbon monofluoride. Specific examples include Li—$SO_2$, Li—$SOCl_2$, Li—$SO_2Cl_2$, Li—$(CF)_x$ and Li—$I_2$ cells. In one embodiment, the metal foil electrode is not used in a lithium-ion cell. In a preferred embodiment, the electrochemical cell is a lithium-sulphur cell comprising the metal foil electrode as the anode, a sulphur-containing cathode and an electrolyte. The sulphur-containing electrode may comprise a slurry comprising sulphur. The slurry may be deposited onto a conductive plate, such as a metal plate or foil. A suitable plate or foil may be formed of aluminium.

The slurry may be formed by mixing elemental sulphur with a support, such as a carbon support. A binder, for example, a polymeric binder may also be present. Suitable binders may be formed from at least one of, for example, polyethyelene oxide, polytetrafluoroethylene, polyvinylidene fluoride, ethylene-propylene-diene rubber, methacrylate (e.g. UV-curable methacrylate), and divinyl esters (e.g. heat curable divinyl esters).

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

EXAMPLE

In this Example, a sheet of Li foil with 60 μm thickness was reinforced using a nonwoven polypropylene (PP) sheet having a thickness of 45 μm. A Li/PP/Li composite having an initial thickness of 220 μm was placed between sheets of polypropylene film and rolled using steel rolls on a roll press (DRM 100/130, Durston, roll gap was adjusted using set of metal wands roll rotation speed: 2.04 cm/s). The sheets of polypropylene film were used to prevent the Li/PP/Li composite from sticking to the steel rollers. The rolling conditions and results are shown in Table 1 below. FIG. 1 is a photograph of the composite before and after rolling.

| No. | Roll gap, μm | % of thickness Of Li foil (of the final value) | Rolls' gap during rolling, μm | Size of Li Foil | Thickness, μm | Length, mm | Width, mm | Dew point, ° C. |
|---|---|---|---|---|---|---|---|---|
| 1 | 200 | — | — | starting | 220 | 60 | 60 | −46 |
|   |     |   |   | final    | 190 | 66 | 60 |     |
|   |     |   |   | difference | −30 | +6 | 0 |     |
| 2 | 180 | — | — | starting | 190 | 66 | 60 |     |
|   |     |   |   | final    | 170 | 72 | 60 |     |
|   |     |   |   | difference | −20 | +6 | 0 |     |
| 3 | 150 | — | — | starting | 170 | 72 | 60 |     |
|   |     |   |   | final    | 150 | 84 | 60 |     |
|   |     |   |   | difference | −20 | +12 | 0 |     |
| 4 | 120 | — | — | starting | 150 | 84 | 60 |     |
|   |     |   |   | final    | 125 | 100 | 60 |     |
|   |     |   |   | difference | −25 | +16 | 0 |     |
| 5 | 100 | — | — | starting | 125 | 100 | 60 |     |
|   |     |   |   | final    | 95 | 124 | 60 |     |
|   |     |   |   | difference | −30 | +24 | 0 |     |
| 6 | 80 | — | — | starting | 95 | 124 | 60 | −46 |
|   |     |   |   | final    | 75 | 149 | 60 |     |
|   |     |   |   | difference | −20 | +25 | 0 |     |
| 7 | 70 | — | — | starting | 75 | 149 | 60 |     |
|   |     |   |   | final    | 65 | 169 | 60 |     |
|   |     |   |   | difference | −10 | +20 | 0 |     |
| 8 | 60 | — | — | starting | 65 | 169 | 60 |     |
|   |     |   |   | final    | 60 | 188 | 60 |     |
|   |     |   |   | difference | −5 | +19 | 0 |     |

The invention claimed is:

1. A lithium-sulphur electrochemical cell comprising a metal foil electrode as the anode, a sulphur-containing cathode and an electrolyte, the metal foil electrode comprising:
   i) a reinforcement layer comprising a porous substrate, and
   ii) first and second layers of metal foil comprising lithium and/or sodium, wherein the reinforcement layer is disposed between the first and second metal foil layers and bonded together to form a composite structure having a thickness of 100 microns or less; and
   wherein the porous substrate comprises a non-conducting fibrous material.

2. An electrochemical cell as claimed in claim 1, wherein the electrochemical cell is a reversible electrochemical cell.

3. The metal foil electrode as claimed in claim 1, wherein the fibrous material is a material formed from polymer fibers.

4. The metal foil electrode as claimed in claim 1, wherein the porous substrate is formed of a material selected from the group consisting of non-woven fabric, woven fabric and polymer mesh.

5. The metal foil electrode as claimed in claim 4, wherein the non-woven or woven fabric is free from metal.

6. The metal foil electrode as claimed in claim 4, wherein the porous substrate is formed from a non-woven polypropylene fabric.

7. The electrochemical cell as claimed in claim 1, wherein the composite structure, of the metal foil electrode, has a thickness of 60 microns or less.

8. The electrochemical cell as claimed in claim 1, wherein the metal foil, of the metal foil electrode, is formed of lithium metal.

9. The electrochemical cell as claimed in claim 1, wherein the reinforcement layer, of the metal foil electrode, has a density of less than 6 g/cm$^3$.

* * * * *